United States Patent [19]

Sloan

[11] Patent Number: 5,152,073
[45] Date of Patent: Oct. 6, 1992

[54] DOWEL CENTERING KIT

[76] Inventor: Robert L. Sloan, 7841 KY 54, Philpot, Ky. 42366

[21] Appl. No.: 729,190

[22] Filed: Jul. 12, 1991

[51] Int. Cl.⁵ .......................... B25H 7/00; B25H 7/04
[52] U.S. Cl. ........................................ 33/670; 33/574; 33/577; 33/666
[58] Field of Search .................. 33/520, 562, 567, 574, 33/577, 578, 644, 666, 669, 670, 671, 676; 82/170, 903

[56] References Cited

U.S. PATENT DOCUMENTS

| | | | |
|---|---|---|---|
| 1,904,242 | 4/1933 | Kieckheafer | 33/670 |
| 2,480,339 | 8/1949 | Dolaser | 33/671 |
| 2,675,625 | 4/1954 | Rayl | 33/574 |
| 4,686,769 | 8/1987 | Röck et al. | 33/613 |

FOREIGN PATENT DOCUMENTS 328111 12/1903 France .................. 82/170

*Primary Examiner*—William A. Cuchlinski, Jr.
*Assistant Examiner*—Alvin Wirthlin
*Attorney, Agent, or Firm*—Leon Gilden

[57] ABSTRACT

A dowel centering kit includes a mounting block, wherein the mounting block includes a plurality of axially parallel first bores of ascending diameter from a first end to a second end of the mounting block, wherein the first bores are arranged to receive various sizes of dowel rods therewithin, wherein a dowel rod is positioned within a first bore and a spike member positioned within a second bore of the first bore, wherein the first bore is directed coaxially of the second bore through a bottom wall of the mounting block, wherein the first bores are directed from a top wall of the mounting block and the spike member includes a projection whereupon impact along a dowel rod effects imparting of a coaxially aligned recess within the dowel rod for its centering relative to various turning and working procedures.

4 Claims, 4 Drawing Sheets

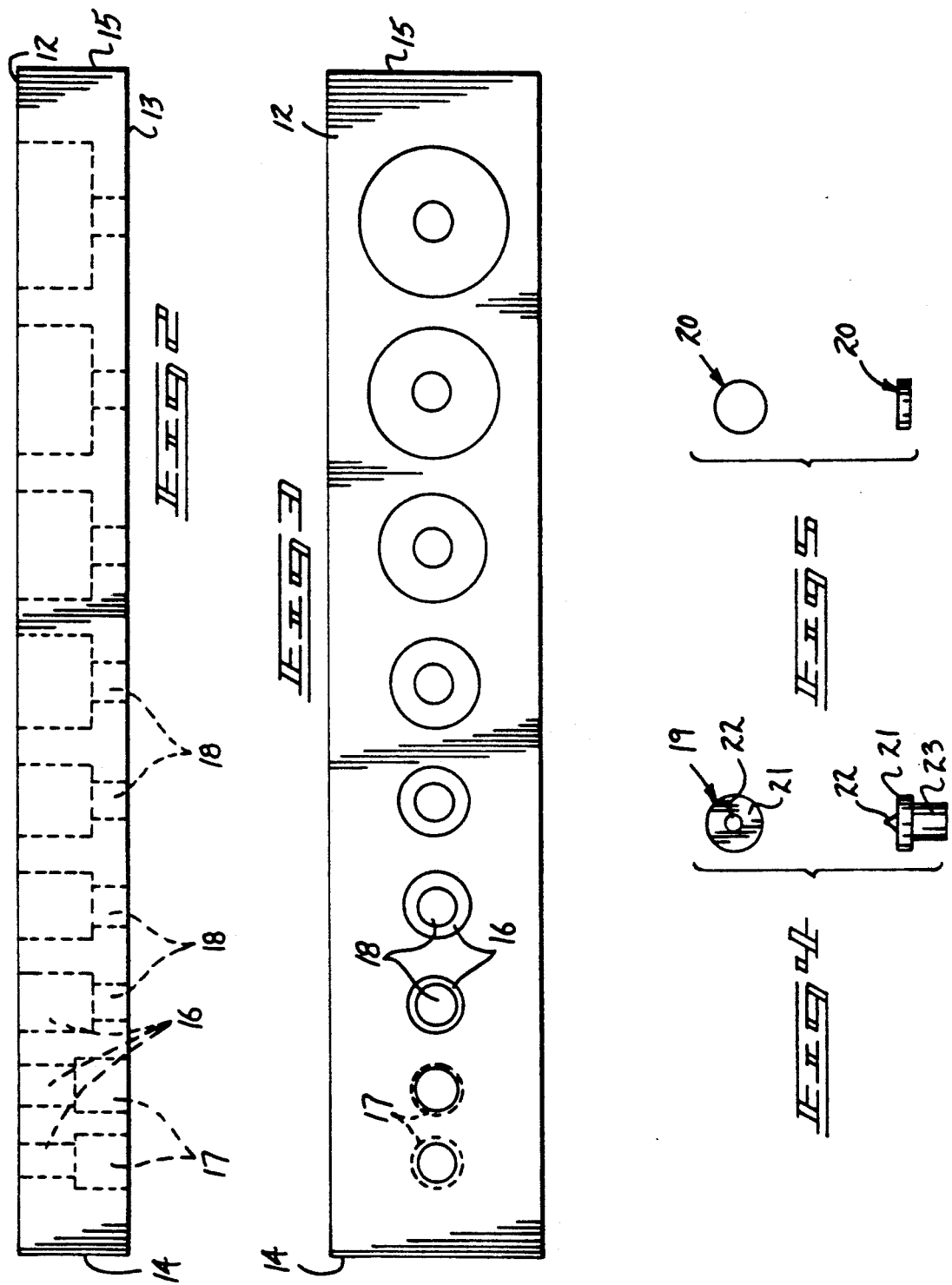

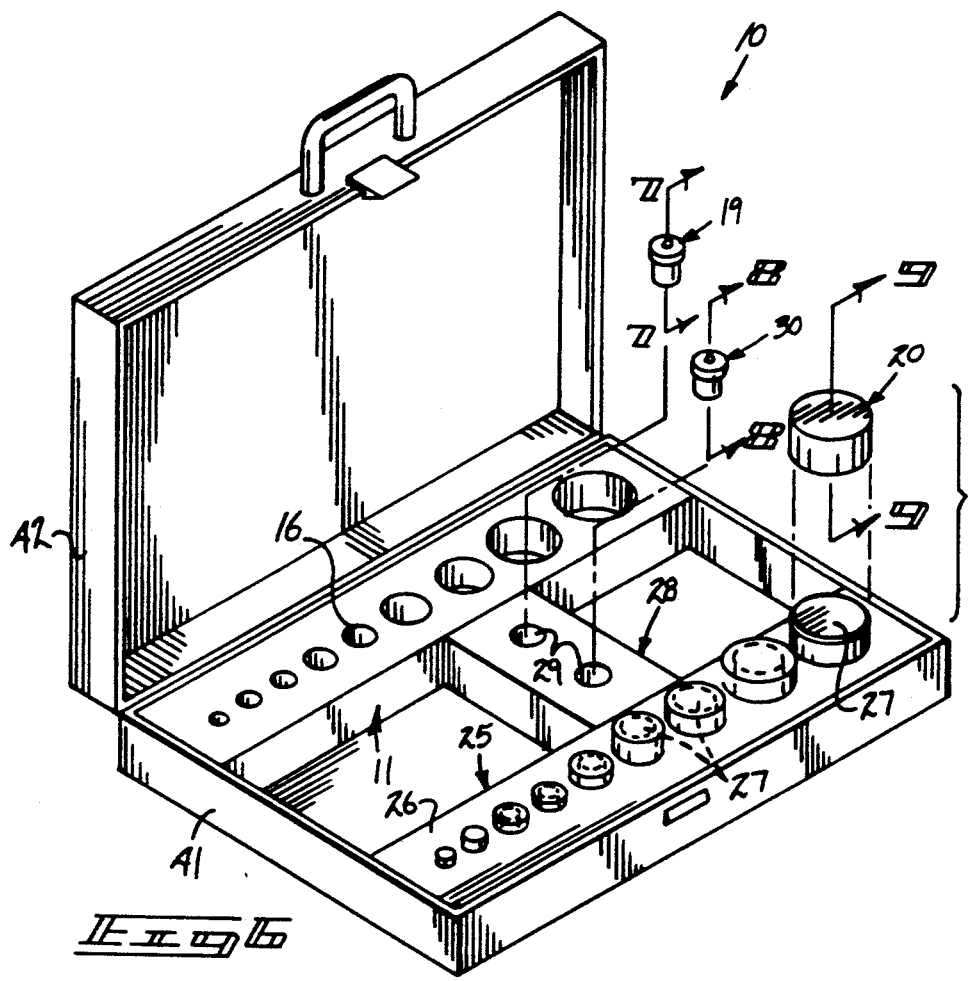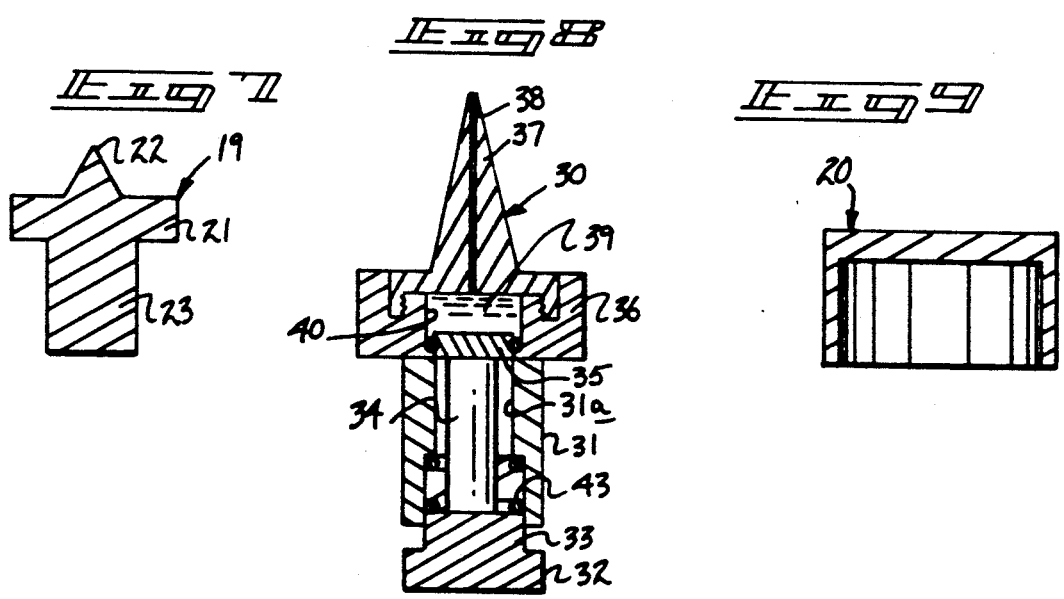

DOWEL CENTERING KIT

BACKGROUND OF THE INVENTION

1. Field of the Invention

The field of invention relates to dowel apparatus, and more particularly pertains to a new and improved dowel centering kit wherein the same is arranged for imparting an indicator recess within a coaxial center of a dowel rod for a subsequent turning procedure.

2. Description of the Prior Art

In various woodworking procedures and the like, dowel rods are frequently positioned within a lathe or other machine tool for turning and other woodworking procedures. To provide proper orientation within a tail stock and the like of a turning machine, the dowel rod must have a center indicated on an end of the dowel rod directed into the tail stock.

Various gauge structure utilized in the prior art for centering devices are typified in U.S. Pat. No. 4,280,279 to Grundfest wherein an alignment tool is arranged for aligning conductors of various multi-conductor cables.

Various jig structure of this type is provided in the prior art and further exemplified in U.S. Pat. No. 4,686,769 to Rock, et al. setting forth a gauge in mounting of hinges and the like.

As such, it may be appreciated that there continues to be a need for a new and improved dowel centering kit as set forth by the instant invention which addresses both the problems of ease of use as well as effectiveness in construction in providing the imparting of depressions within an axial center of a dowel rod end and in this respect, the present invention substantially fulfills this need.

SUMMARY OF THE INVENTION

The present invention provides a dowel centering kit wherein the same is arranged for positioning and imparting a depression within a dowel rod end for locating the dowel rod axial center. As such, the general purpose of the present invention, which will be described subsequently in greater detail, is to provide a new and improved dowel centering kit which has all the advantages of the prior art dowel centering apparatus and none of the disadvantages.

To attain this, the present invention provides a dowel centering kit including a mounting block, wherein the mounting block includes a plurality of axially parallel bores of ascending diameter from a first end to a second end of the mounting block, wherein the first bores are arranged to receive various sizes of dowel rods therewithin, wherein a dowel rod is positioned within a first bore and a spike member positioned within a second bore of the first bore, wherein the first bore is directed coaxially of the second bore through a bottom wall of the mounting block, wherein the first bores are directed from a top wall of the mounting block and the spike member includes a projection whereupon impact along a dowel rod effects imparting of a coaxially aligned recess within the dowel rod for its centering relative to various turning and working procedures.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved dowel centering kit which has all the advantages of the prior art dowel centering apparatus and none of the disadvantages.

It is another object of the present invention to provide a new and improved dowel centering kit which may be easily and efficiently manufactured and marketed.

It is a further object of the present invention to provide a new and improved dowel centering kit which is of a durable and reliable construction.

An even further object of the present invention is to provide a new and improved dowel centering kit which is susceptible of a low cost of manufacture with regard to both materials and labor, and which accordingly is then susceptible of low prices of sale to the consuming public, thereby making such dowel centering kits economically available to the buying public.

Still yet another object of the present invention is to provide a new and improved dowel centering kit which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an orthographic side view of the mounting block.

FIG. 3 is an orthographic top view of the mounting block.

FIG. 4 is an orthographic top and side view of a spike member utilized by the instant invention.

FIG. 5 is an orthographic top and side view of a cap member utilized by the invention.

FIG. 6 is an isometric illustration of the kit structure utilized by the instant invention.

FIG. 7 is an orthographic view, taken along the lines 7—7 of FIG. 6 in the direction indicated by the arrows.

FIG. 8 is an orthographic view, taken along the lines 8—8 of FIG. 6 in the direction indicated by the arrows.

FIG. 9 is an orthographic view, taken along the lines 9—9 of FIG. 6 in the direction indicated by the arrows.

DESCRIPTION OF THE PREFERRED EMBODIMENT

Figure 1:
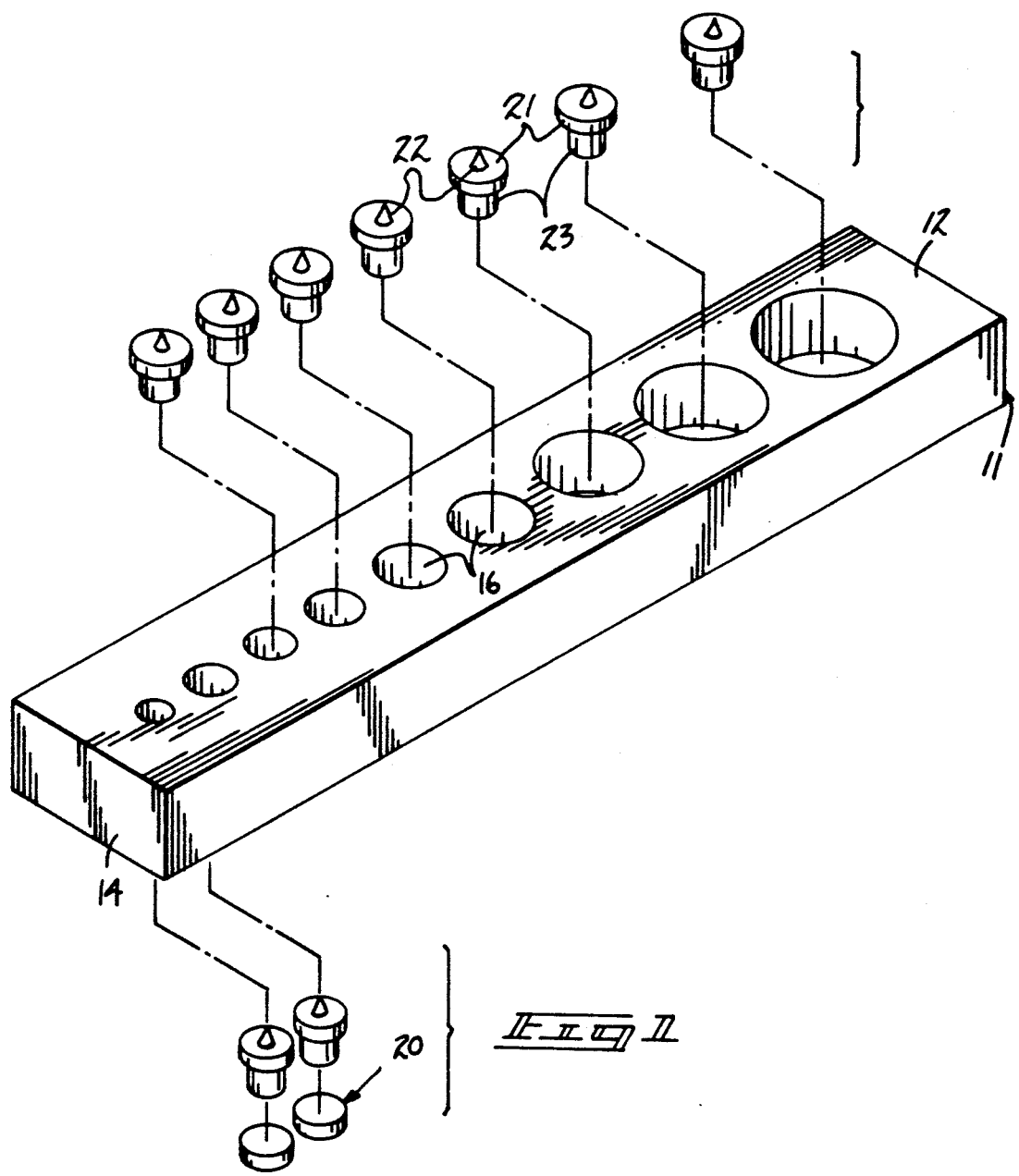
FIG. 1 is an isometric illustration of the mounting block and associated centering spike members of the instant invention.

With reference now to the drawings, and in particular to FIGS. 1 to 10 thereof, a new and improved dowel centering kit embodying the principles and concepts of the present invention and generally designated by the reference numeral 10 will be described.

More specifically, the dowel centering kit 10 of the instant invention essentially comprises a mounting block 11 defined by a mounting block top wall 12 spaced from a mounting block bottom wall 13. A mounting block first end 14 is spaced from a mounting block second end 15, wherein the mounting block is defined by a parallelepiped configuration. A row of axially parallel first bores are spaced apart between the block first end 14 and the block second end 15. The first bores 16 are of sequentially increasing diameter from the block first end 14 relative to the block second end 15. The bores 16 are further projected interiorly of the mounting block 11, with each bore axis orthogonally oriented relative to the top wall 12 projecting downwardly from the top wall 12. A plurality of second bores 17 each of an equal second bore diameter, are aligned with a plurality of first bores. The second bores are defined by a second bore length. A series of third bores 18 are of a predetermined third bore length and a third bore diameter, and wherein the third bores are coaxially aligned with remaining first bores, wherein the second bores and third bores are projected orthogonally into the mounting block from the bottom wall 13.

Figure 10:
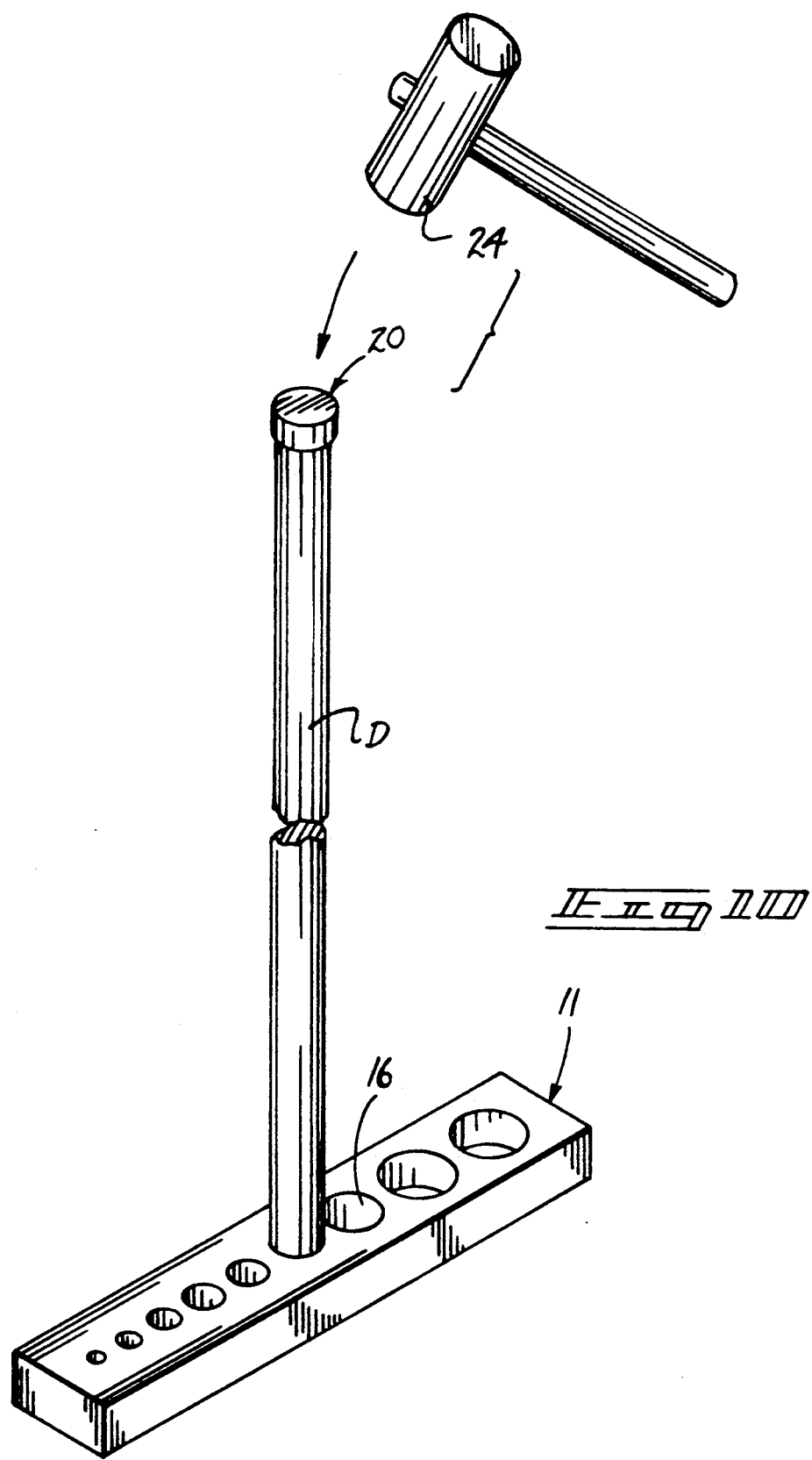
FIG. 10 is an isometric illustration of the invention in use.

A spike member 19 is provided in cooperation with a cap member 20. Each spike member 19 is defined by spike member cylindrical collar 21 defined by a diameter substantially equal to the second bore diameter, including a spike projection 22 coaxially mounted to the top surface of the spike member cylindrical collar 21. A spike member support cylindrical base 23 defined by a predetermined diameter substantially equal to the third bore diameter is provided and defined by a cylindrical base length substantially equal to the third bore length. Each second bore length is substantially equal to a spacing or spike length from a top surface of the spike member cylindrical collar 21 to a bottom surface of the spike member support base 23. In this manner, the first bores 16 are arranged to receive dowels of varying diameters, wherein a plurality of the first bores 16 adjacent the first end 14 are of insufficient diameter to receive the collars 21, whereupon the collars 21 are directed into the second bores 17, as illustrated in FIG. 2, wherein the spike projection 22 projects into the first bores associated with the second bores for positioning of a lower terminal end of a dowel rod, in a manner as illustrated in FIG. 10. The cylindrical cap member 20 is provided defining a cylindrical skirt and a top planar web to receive an upper terminal end of an associated dowel rod "D" to accommodate a hammer 24 striking the cap member 20 to minimize splitting of the dowel rod when struck by the hammer 24.

The kit construction, as illustrated in FIG. 6, includes a second mounting block 25 defining a second block top wall 26, including a row of rigid cylindrical boss members 27 of varying diameters to receive a set of cap members 20 thereon. The cap members 20 are also of varying diameters and are of the varying diameters to accommodate varying external diameters of the dowel rods "D" utilized.

FIG. 8 illustrates a modified spike member 30 positioned within a third mounting block 28 within one of the mounting block bores 29 accommodating the modified spike member 30 and the spike member 19 therein. The modified spike member 30 includes a tubular collar 31, including a tubular collar bore directed therethrough. A cylindrical base 32 is provided with a cylindrical base extension 33 received through a lower terminal end of the tubular collar bore 31a, wherein a spring member 43 is captured between an upper terminal end of the cylindrical base extension 33 and the recess within a lower portion of the tubular collar 31. The cylindrical base extension 33 mounts the extension rod 34 coaxially thereof extending upwardly to mount a piston 35 at an upper terminal end thereof. The piston 35 projects sealingly within a fluid reservoir 39 formed within a cylindrical collar central bore 40 of an associated cylindrical collar 36. A conical projection 37 is mounted coaxially of the cylindrical collar 36 and the tubular collar 31, whereupon impact of a dowel rod upon the upper terminal end of the conical projection 37 directs a fluid through a conduit 38 directed coaxially of the conduit projection 37 to impart an indicator die onto an axial center of an associated dowel rod, as well as imparting an indentation within the dowel rod by impact of the hammer 10 upon the dowel rod "D", as illustrated in FIG. 10, when the modified spike member 30 is positioned within one of the first bores 16 and the tubular collar 31 is directed into a third bore 18. The block 11, the use of the second mounting block 25, and the third mounting block 28 are mounted fixedly within a base container 41, with a lid 42 pivotally mounted thereon to secure the various components of the kit structure for storage and transport thereof.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A dowel centering kit, comprising,
   a first mounting block, the first mounting block including a mounting block first top wall spaced from and parallel to a first mounting block bottom wall, and
   including a block first end spaced from a block second end, and
   a row of axially parallel first bores of ascending diameter from the first end to the second end, wherein each of the first bores projects interiorly of the first mounting block from the first mounting block top wall, and
   at least one of the first bores including a coaxially aligned second bore projecting into the first mounting block from the first mounting block bottom wall, and
   at least a further first bore of the row of first bores including a third bore coaxially aligned therewith projecting interiorly of the first mounting block from the first mounting block bottom wall, and
   a spike member, the spike member including a cylindrical collar, the cylindrical collar equal to a predetermined diameter, and
   the second bore equal to the predetermined diameter, and
   the spike member cylindrical collar receivable within the second bore, the spike member cylindrical collar including a spike projection coaxially aligned with the cylindrical collar projecting above the cylindrical collar, and
   the spike member cylindrical collar including a spike member support cylindrical base, the cylindrical base defined by a third bore diameter equal to the third bore, wherein the spike member support cylindrical base is receivable within the third bore, with the spike member cylindrical collar positioned within the further first bore coaxially aligned with the third bore, and wherein the spike member cylindrical collar is further receivable within the second bore, with the spike member projecting into said at least one first bore.

2. A dowel centering kit as set forth in claim 1 wherein the kit further includes a cylindrical cup member, and the cylindrical cup member positionable upon an upper terminal end of a dowel rod, and the lower terminal end of the dowel rod receivable within one of said first bores.

3. A dowel centering kit as set forth in claim 2 further including a modified spike member, the modified spike member including a tubular collar, the tubular collar including a collar bore defined by a collar bore diameter, and a cylindrical base, the cylindrical base including a cylindrical base extension receivable within the tubular collar bore, and the cylindrical base extension including an extension rod coaxially and fixedly mounted to a top surface of the cylindrical base extension, and the extension rod including a piston fixedly mounted to an upper terminal end of the extension rod, and a cylindrical upper collar, the cylindrical upper collar fixedly mounted to an upper terminal end of the tubular collar, and the cylindrical collar including a central reservoir, the central reservoir including a fluid dye contained therewithin, and the piston receivable within the fluid reservoir, and a conical projection secured to and medially of the cylindrical collar coaxially aligned therewithin, wherein the conical projection includes a conical projection conduit coaxially aligned with the conical projection in communication with the fluid reservoir, and a spring member mounted between the cylindrical base extension wound about the extension rod and mounted within the tubular collar to normally bias the cylindrical base and the cylindrical base extension below the tubular collar, wherein the tubular collar is receivable within a plurality of said first bores.

4. A dowel centering kit as set forth in claim 3 wherein the first mounting block is positionable within a base container, and a second mounting block mounted within the base container adjacent the first mounting block, wherein the second mounting block includes a plurality of rigid cylindrical boss members extending upwardly of the second mounting block, wherein each rigid boss is of a varying diameter relative to an adjacent cylindrical boss for receiving a respective cap member thereon, and a third mounting block mounted within the base container, wherein the third mounting block includes a third mounting block first bore and a third mounting block second bore, the third mounting block first bore slidably receives the spike member therewithin, and the third mounting block second bore slidably receives the modified spike member therewithin.

* * * * *